US006163628A

United States Patent [19]
Ibenthal et al.

[11] Patent Number: 6,163,628
[45] Date of Patent: *Dec. 19, 2000

[54] METHOD OF DATA REDUCTION BY MEANS OF FRACTAL IMAGE CODING

[75] Inventors: Achim Ibenthal, Elmshorn; Detlef Götting, Hamburg; Rolf-Rainer Grigat, Halstenbek, all of Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/639,987

[22] Filed: Apr. 26, 1996

[30] Foreign Application Priority Data

May 6, 1995 [DE] Germany .............................. 195 16 742

[51] Int. Cl.$^7$ ................................. G06K 9/36; G06K 9/46
[52] U.S. Cl. ............................................. 382/249; 382/240
[58] Field of Search .................................... 382/249, 240, 382/241, 253

[56] References Cited

U.S. PATENT DOCUMENTS 5,497,435 3/1996 Berger ...................................... 382/249

OTHER PUBLICATIONS

"Fractal Image Coding and Magnification Using Invariant Features", by Gotting et al., Fractals, vol. 5, Supplementary Issue (Apr. 1997) pp. 65–74.

"Multi–Resolution Tree Search for Iterated Transformation Theory–Based Coding", by M. Kawamata et al., IEEE, Nov. 1994, pp. 137–141.

Senile Depth First Search Applied to Iterated Function Systems', IBM Technical Disclosure Bulletin, Jan. 1992, vol. 34, No. 8., pp. 275–277.

Image Coding Based on a Fractal Theory of Iterated Contractive Image Transformation, Arnaud E. Jacquin, IEEE Transactions on Image Processing, vol. 1, (1), pp. 18–30, Jan. 1992.

"A Fractal Theory of Iterated Markov Operators with Applications to Digital Image Coding", by Arnaud E. Jacquin, Thesis Georgia Institute of Technology, Aug. 1989.

"Multidimensional Binary Search Trees in Data base Applications", by Jon Bentley, reprinted from IEEE Transactions on Software Engineering, vol. SE–5, No. 4, Jul. 1989, pp. 333–340.

*Primary Examiner*—Phuoc Tran

[57] ABSTRACT

In a method of data reduction of a luminance and/or chrominance signal of a digital picture signal by means of fractal image coding, in which method each image of the luminance/chrominance signal is divided into range blocks of n×n pixels each, in which a domain block is searched for each range block, which domain block is imageable on the range block with a minimal deviation while using a transformation function, which domain blocks have a larger size than the range blocks, and in which information on the transformation functions is transmitted, from which information the image data are regained at the receiver end in an iterative process, the search is facilitated in that a digital search tree strategy is employed in the search for that domain block which is imageable on a range block with a minimal deviation while using a transformation function.

7 Claims, 3 Drawing Sheets

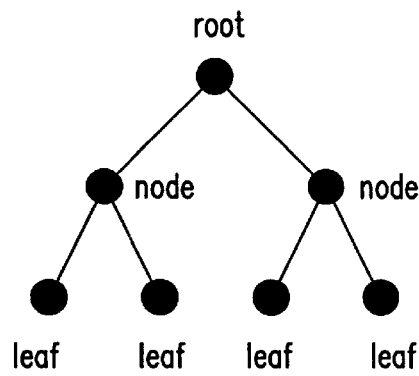
FIG. 1
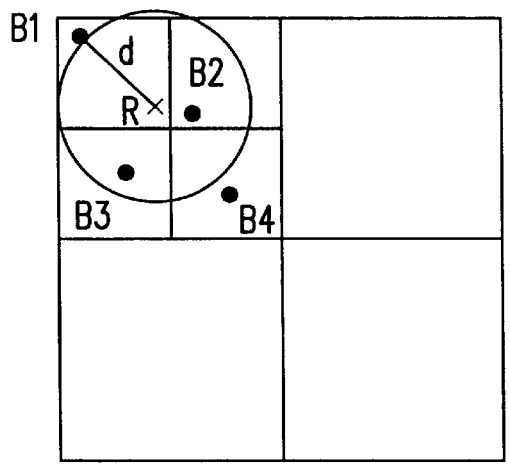
FIG. 4
| A | B | B | A |
|---|---|---|---|
| B | C | C | B |
| B | C | C | B |
| A | B | B | A |
FIG. 5

METHOD OF DATA REDUCTION BY MEANS OF FRACTAL IMAGE CODING

BACKGROUND OF THE INVENTION

The invention relates to a method of data reduction of a luminance and/or chrominance signal of a digital picture signal by means of fractal image coding, in which method each image of the luminance/chrominance signal is divided into range blocks of n×n pixels each, in which a domain block is searched for each range block, which domain block is imageable on the range block with a minimal deviation while using a transformation function, which domain blocks have a larger size than the range blocks, and in which information on the transformation functions is transmitted, from which information the image data are regained at the receiver end in an iterative process. The invention also relates to arrangements for performing the method.

A method of data reduction of a picture signal or of components of a picture signal by means of fractal image coding, in which an image is divided into range blocks and domain blocks, is known from "Image Coding Based on a Fractal Theory of Iterated Contractive Image Transformation, Arnaud E. Jacquin, IEEE Transactions on Image Processing, Vol. 1 (1), pp. 18 to 30, January 1992. According to Jacquin, an image of a picture signal is split up into what are called range blocks. Each range block is assigned a function, which should have the property of contractivity, and images an arbitrary block, referred to as domain block, on the range block. These functions of all range blocks of an image jointly constitute a function system which is also referred to as iterated function system.

At the encoder end, this method presents the problem that a domain block must be found for each range block, which domain block should be imageable on the range block with minimal errors while using the transformations found. To this end, all domain blocks in question must be examined on these criteria. It should be noted that the domain blocks may fundamentally be arranged arbitrarily in the image. Thus, for example, a block of 2n×2n pixels should not only be examined on its original location, but also, for example, rotated 90°, 180° and 270° in different directions. The process of searching an appropriate domain block for each range block in an image is thus very elaborate.

A search method, in which also each domain block which is possible in the image is examined for each range block and the optimum imaging prescription is computed for each of these pairs, is known from "Fractal Image Compression", M. F. Barnsley, L. B. Hurd, Academic Press Professional 1993. However, this is an elaborate process. In an image with n×n pixels, the search process is of the order of $o(n^2)$.

A search method, in which the domain blocks are grouped in different classes and only the domain blocks of the appropriate classes are searched for a matching range block, is known from "A Theory of Iterated Markov Operators with Applications to Digital Image Processing" by A. E. Jacquin, PhD Thesis, Georgia Institute of Technology, USA, 1989. This method operates more rapidly than Barnsley's method, but the computation complexity further remains of the order of $o=n^2$.

SUMMARY OF THE INVENTION

It is an object of the invention to mitigate the elaborate search for the domain blocks.

This object is solved in that a digital search tree strategy is employed in the search for that domain block which is imageable on a range block with a minimal deviation while using an associated transformation function.

Such search strategies, in which a search tree is set up and is subsequently run through in the search process, are known per se, for example, from "Multidimensional Binary Search Trees in Database Applications" by J. L. Bentley, IEEE Transactions on Software Engineering, Vol. SE-5, No. 4, July 1979, pp. 333 to 340. These search tree strategies may be advantageously used for methods of data reduction of a picture signal by means of fractal image coding, because it is no longer necessary to examine all blocks in the search for appropriate domain blocks, while only predetermined, relatively short periods of time are available for the image coding operation. A search tree is set up whose branches are formed by keys of the domain blocks which are to be examined. The search tree is set up by analysis of all these keys of all the domain blocks. If a domain block is searched for a given range block, which domain block is imageable on the range block with a minimal deviation while using an associated transformation function, the same keys as used for the domain blocks in the formation of the search tree must be used for this range block. The search tree is then run through by comparing the keys of the range blocks with the keys of the different domain blocks introduced in the search tree, until an end point of the tree is reached. The domain block which is before this end point has keys which are most similar to those of the range block for which the domain block is searched. This block is then the searched domain block.

By using this search tree strategy for the problems of fractal image coding, a clear, simplified or shorter search is the result, because only this one path is run through from the root of the search tree to the end of a branch of the search tree, i.e. all comparisons should be performed for domain blocks for which a branch is formed which is located on this search path. All other domain blocks should not be searched. In contrast to the prior art search strategy, only an order of $O(\text{Log}(n))$ is used for the computation complexity, in which $N^2$ is equal to the product of the number of pixels in an image.

In one embodiment of the method, domain block keys are used as criteria for the search tree structure, which keys are invariant with respect to a local rotation and/or mirrored position of the domain blocks, and the same keys are employed for the range blocks.

Since in the method of data reduction by means of fractal image coding the domain blocks should generally not be compared with the range blocks in their original position but also in different rotated and/or mirrored positions, the search tree strategy provides the possibility of introducing the keys of the domain blocks in these different rotated and/or mirrored positions in the search tree. According to the invention, the search tree may be further simplified in that keys are used for a domain block which are invariant in different planes with respect to a rotation and/or mirrored position of this domain block. This means that these keys represent the properties of the domain block in all possible different positions which are to be examined. A domain block is then to be introduced in the search tree only once, even when different positions of this domain block are to be used for the comparison with the range blocks.

For example, in a further embodiment of the invention, the invariant keys may also be generated by grouping the pixels of a block in categories, the pixels of a category within the block being arranged in such a way that the pixels of this category are again present at a location of a pixel of the same category after one of the admissible rotations or mirrored positions of the block, while the sum of the values of the pixels of a category each time constitutes an invariant key.

The pixels in one block are thus grouped in categories. The pixels of a category are distinguished in that, after one of the rotations or mirrored positions admissible for the block, a given pixel again lands at a position in the block at which a pixel of the same category was previously present. Due to these admissible rotations or mirrored positions, the pixels of a category are thus always imaged at locations at which a pixel of the same category was previously present. Dependent on the size of the blocks, as many different categories may result. The values of the pixels of a category are cumulated. This sum represents an invariant key. There may be as many invariant keys for the block as there are different categories possible. This mode of gaining the invariant keys ensures that these keys are invariant with respect to the admissible rotations or mirrored positions.

In a further embodiment of the invention, a search tree is constructed in accordance with the invariant keys of all domain blocks, which search tree is subsequently run through in accordance with the similar invariant keys of each range block for which a domain block is searched, until an end point (leaf) of the search tree is reached, while the domain block, based on whose keys the branch last run through in the search tree was inserted in the tree, represents the searched domain block.

A search tree set up in accordance with the invariant keys of the domain block is run through only once for the search of a domain block associated with a range block. The same invariant keys, i.e. those which are determined in the same manner as for the domain blocks, should then be used for the range block. These keys are compared with the keys of the domain blocks which are introduced as branches in the search tree. At each branch of the tree, the keys introduced there are compared with those of the range block. In this way, a part of the tree is run through until an end is reached, which is generally referred to as leaf. The last branch before this leaf, which has been set up in accordance with the key data of one of the domain blocks, indicates that domain block which is most similar to the keys of the range block for which a domain block is searched. Then that domain block is found which is imageable on the range block with a minimal deviation while using the transformation function.

In a further embodiment of the method according to the invention, the nodes of the search tree at the search-tree level which is one stage higher are examined on whether one of the domain blocks, based on whose keys one of these nodes was set up, is located closer to the keys of the range block as far as all its keys are concerned, while this domain block instead of the domain block, based on whose keys the end point was formed, may be selected.

As explained above, that domain block, based on whose keys the previous branch was set up and was introduced as the last branch before the end point of the search tree, can generally be assumed to be the most favourable. However, in particular cases, also the keys of other domain blocks may be more similar to the range block for which an appropriate domain block is searched.

In accordance with a further embodiment of the invention, the difference between the range block and the most favourable domain block is determined, the search tree is run through as far as a node whose associated domain block reaches or exceeds this difference after all deviating directions, all domain blocks of the subtree up to this node are subsequently examined on whether they deviate to an even smaller extent from the range block than the domain block originally determined as the most favourable block, and, if necessary, the most favourable domain block of this subtree is selected.

In a further embodiment of the invention, the search tree is constructed as a one-dimensional search tree whose nodes are each time given a value of that key whose value deviates most from the mean value of the range of values of the key still remaining in the relevant branch of the tree.

For the domain blocks and the range blocks, a plurality of invariant keys per block is generally used for the search tree strategy. A corresponding multidimensional search tree may be formed. However, for further simplifying the search, a one-dimensional search tree may be formed, in which at each branch of the search tree only one of the keys of the blocks is taken into account. Upon formation of the search tree, only a value of that key is introduced at a new node which deviates most from the mean value of this key. The mean value results from the minimum and maximum value which this key can assume. If the key has already been introduced in the tree beforehand and if, on the basis of this key, a branch has already been set up in the tree, only the remaining range of values is taken into consideration. For example, if a key whose range of values is between 0 and n has already been introduced once in the search tree, namely at the value n/2, only the range of values from 0 to n/2 is subsequently considered for this key at the left of the node and only the range of values from n/2 to n is considered for this key at the right of the node.

In the formation of the tree or its branches, that key is each time selected whose value deviates most from the mean value computed in accordance with the criteria explained above. The value of this key is introduced as a new decision threshold in the newly formed branch.

In accordance with a further embodiment of the invention, the data of each range block are examined on geometrical basis functions which are possibly satisfactory approximations of the data structure of the range block, a difference value is computed from the basis function found for the best approximation of the data structure of the range block and the data of the range block, which difference value represents a residual roughness, the data of the domain blocks are examined on geometrical basis functions which are possibly satisfactory approximations of the data structure of the domain block, a difference value is computed from the basis function found for the best approximation of the data structure of the domain block and the data of the domain block, which difference value represents a residual roughness, the search tree strategy is used in the search for the domain block which is imageable on a range block with a minimal deviation, the associated transformation function is performed with reference to the computed difference values of the range block and the computed difference values of the domain blocks, and information on the mutually balanced basis functions of this block and of the most favourable domain block, as well as the transformation function, by means of which the most favourable domain block is imageable on the range block, is transmitted for each range block as a data-reduced data current instead of the luminance/chrominance signal.

In this mode of fractal image coding, the data of a range block, for which the most favourable domain block is to be searched, are first searched on geometrical basis functions. To this end, the data structure of this block may be converted, for example, into a serial sequence of image data which represent the pixels of this block. This sequence of image data can now be searched on geometrical basis functions which already represent the basic variation of this data structure. What remains is a residual roughness, which is formed in that the data are subtracted from the original data of the range block in accordance with the geometrical basis functions found. The resultant difference value, which constitutes the residual roughness, is then used in the search for an appropriate domain block.

In a corresponding manner, the data of all domain blocks, an appropriate one of which is now being searched, are initially also examined on their geometrical basis functions. If an appropriate geometrical basis function approximately representing the data structure of each domain block is found, then a basic component is subtracted from each domain block in accordance with the geometrical basis function found. The difference value, comprising the residual roughness, then remains again.

The above-described difference value of the residual roughness of the range block is now compared with the difference values of all domain blocks as to which of these domain blocks images the remaining difference value of the domain block on the remaining difference value of the range block with a minimal error while using a transformation function.

These transformation functions, which constitute the above-described function system, must then be transmitted at the receiver end. Additionally, information about the geometrical basis functions found for the range block and the associated domain block must be transmitted. This information may also be transmitted in the form of a subtraction of these two geometrical basis functions.

Since, in the search for an appropriate domain block for each range block, it is no longer necessary to examine the overall data structure of the blocks, but only the above-described difference values which represent the residual roughness of these blocks after the geometrical basis function has been subtracted from the data of the block, a simplified search is the result. Due to the subtraction of the basis functions, for example, the absolute amplitude, i.e. luminance, of the blocks does not play a role for the data structure of the compared blocks. This similarly applies, for example, to transmitted edges. For example, an edge of a range block may have a different edge height than, for example, a similar edge of a domain block, but the variation of the edge as such is similar. Due to the subtraction of the geometrical basis functions, only the structures of the blocks are quasi-examined, rather than the absolute amplitude or arrangement which may change in accordance with the geometrical basis function in the course of the image contents of the block. The search process is then considerably simplified, because similar structures can be found much more easily without taking superimposed geometrical basis functions into account.

This search process can be further simplified by using the search tree strategy according to the invention, because only the residual roughnesses are relevant for the search, on the one hand, and because not all these residual roughnesses are to be compared with each other, on the other hand. For a range block, only its residual roughness should be compared with a part of the residual roughnesses of the domain blocks in the search tree.

According to the invention, an encoder, which combines these two simplifications of the search for appropriate domain blocks, is characterized in that after formation of the range blocks and the domain blocks, the encoder splits off the most favourable basis function for each block, subsequently determines for each range block, with reference to its difference value and by means of the digital search tree strategy, that domain block whose difference value is imageable on the range block with a minimal deviation while using the transformation function, in that the encoder balances the difference value of the range block and that of the most favourable domain block, and in that the encoder supplies this balanced difference value as well as the transformation function, by means of which the most favourable domain block is imageable on the range block, as an output signal.

These and other aspects of the invention will be apparent from and elucidated with reference to the embodiments described hereinafter.

BRIEF DESCRIPTION OF THE DRAWING

In the drawings:

FIG. 1 shows diagrammatically a search tree,

FIG. 4 shows diagrammatically a special case for the search tree strategy, FIG. 5 shows diagrammatically a block for explaining a possible mode of gaining invariant keys.

DETAILED DESCRIPTION OF THE PREFERRED EMBODIMENTS

FIG. 1 shows diagrammatically a basic structure of a search tree as used in accordance with the invention for the search for appropriate domain blocks. The search tree has a starting point referred to as root. This starting point represents a branch in itself. At a further level, further nodes follow which also represent branches. In principle, there may be an arbitrary number of levels with nodes of this type.

Finally, there is a last level in the search tree in which there are only end points which do not constitute any further branches. These end points are referred to as leaves.

At each of the branches, a decision in accordance with a given key is taken.

The structure of such a search tree for various domain blocks will hereinafter be explained in greater detail with reference to FIGS. 2 and 3.

Figure 2:
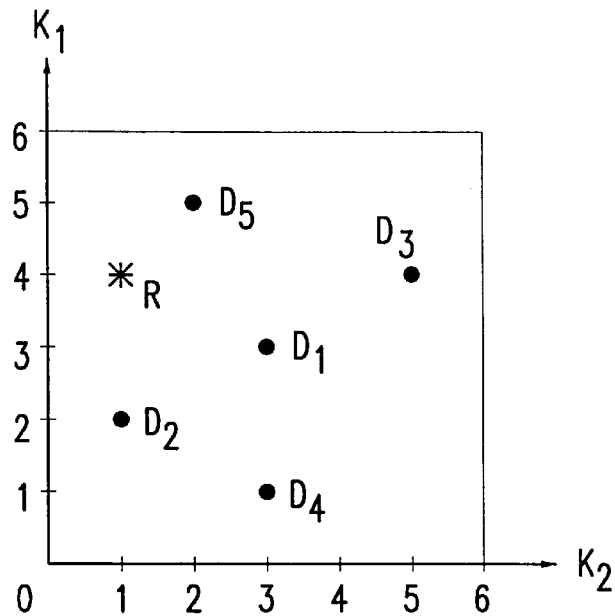
FIG. 2 shows diagrammatically a range block and some domain blocks after two invariant keys $K_1$ and $K_2$.

FIG. 2 is a diagrammatical representation in which the domain blocks $D_1$ to $D_5$ are shown on a plane subtended by two axes.

The two axes $K_1$ and $K_2$ of the diagram indicate values for two invariant keys of these domain blocks. The values of the invariant key $K_1$ may be within a range of 0 to 6; the same applies to the range of values of the second invariant key $K_2$.

Each domain block has a value for $K_1$ and $K_2$. The domain blocks $D_1$ to $D_5$ are shown in the system of axes in FIG. 2 in accordance with the values of these two invariant keys. FIG. 2 also shows a range block R whose keys $K_1$ and $K_2$ mark its position.

By way of example, FIG. 2 shows two invariant keys $K_1$ and $K_2$. However, for each block, a larger number of invariant keys may be used for the search tree strategy. The invariant keys may fundamentally be gained in different manners. An advantageous possibility is to apply, for each pixel of a block, an evaluation function to the pixel values of neighbouring pixels in dependence upon their distance to the pixel, to raise these evaluated values to a power and to form the mean value from the sums of these powers. Such an invariant value then results for each pixel of a domain block. For each domain block, there is a number of invariant keys whose number corresponds to the pixels of the domain block. A further possibility of gaining the invariant keys will be described with reference to FIG. 5.

With reference to the diagrammatical representation in FIG. 3, it will now be described how a one-dimensional search tree can be built up from the data of the two invariant keys $K_1$ and $K_2$ of the domain blocks $D_1$ to $D_5$ shown in FIG. 2.

The structure of a one-dimensional search tree is again only one possibility, but is much simpler as compared with a multidimensional search tree in which a dimension is provided for each key.

FIG. 3 shows several phases of setting up this one-dimensional search tree, in which an additional branch in accordance with the data of the keys $K_1$ and $K_2$ of a domain block is inserted at each phase.

Figures 3A, 3B, 3C:
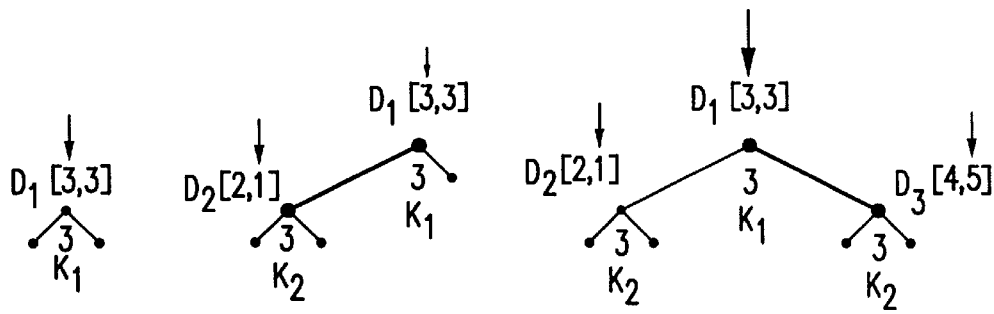
FIGS. 3a–e shows diagrammatically a search tree for the domain blocks shown in FIG. 2.

FIG. 3a) shows a branch. This branch is obtained on the basis of the data of the domain block $D_1$. Both key $K_1$ and key $K_2$ have the value of 3 for this domain block. Therefore, the key $K_1$ is used for the branch shown in FIG. 3a). The value of 3 is used in this case.

FIG. 3b) shows this branch. Now, the domain block $D_2$ should be introduced in the search tree which is being set up. First, a decision is taken at the branch in conformity with the data $D_1$. Since the domain block $D_2$ has the value of 2 for the key $K_1$ for which the decision is taken at the node $D_1$, which value is smaller than the value $K_1=3$ introduced in the branch, a branch to the left, towards smaller values is taken. Thus, a new node is introduced, which corresponds to the values 2 and 1 of the keys $K_1$ and $K_2$ of the domain block $D_2$. The value of that key of the domain block $D_2$ which deviates most from the mean value in the remaining range of values of this key is now chosen as a decision threshold for this node.

At this position, only the range of values between 0 and 3 remains for the key $K_1$, because a decision <3 was already taken in the first node $D_1$. The domain block $D_2$ has the value of 2 for $K_1$. The mean value of 0 and 3 is 1.5, so that the deviation of the value $K_1=2$ of the domain block $D_2$ deviates by 0.5 from the mean value resulting from the difference between 0 and 3. The key $K_2$ of the domain block $D_2$ is 1. The range of values still available for this key is, however, between 0 and 6, because the range of values of this key has so far not been limited in any branch of the search tree. The mean value for $K_2$ is thus still 3 at this position. The deviation of the value $K_2=1$ of the domain block $D_2$ from this mean value is 2. This means that this deviation of the value of $K_2$ from this mean value is larger than the deviation of 0.5 found for the key $K_1$. The key $K_2$ is thereby selected for the branch of this node. The remaining mean value of the range of values between 0 and 6, i.e. 3, is introduced in the node.

FIG. 3c) shows a further node obtained on the basis of the values of the keys $K_1$ and $K_2$ of the further domain block $D_3$. For this domain block $D_3$, the value of $K_1=4$ and $K_2=5$. First, the branch $D_1$ is passed, at which the value $K_1=4$ is compared with the introduced value for the branch of $K_1=3$. Since the value 4 is higher than 3, the search tree is further developed to the right for higher values of $K_1$. Here, a further node is formed in conformity with the domain block $D_3$. Here again, it should be determined which of the values 4 for $K_1$ and 5 for $K_2$ further deviates from the mean value of the remaining range of values of each key. The value 4 of $K_1$ deviates by 0.5 from the mean value 4.5 of the remaining range of values between 3 and 6 for the key $K_1$. However, the value 5 for $K_2$ deviates by 2 from the mean value 3 of the remaining range of values between 0 and 6 of the key $K_2$. The mean value 3 of the remaining range of values of the key $K_2$ is thereby introduced as a new decision threshold.

Figures 3D, 3E:
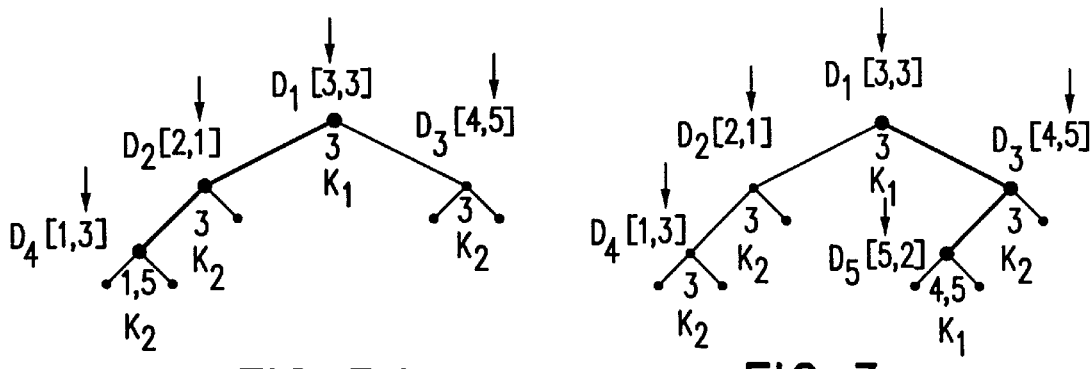

FIG. 3d) shows a further phase in the creation of the search tree, in which the domain block $D_4$ and its values for producing a further branch are used.

The value $K_1=1$ of the domain block 4 leads to the fact that both the branch $D_1$ and the branch $D_2$ are passed on the left, because the value for $K_1$ in the node $D_1$ is smaller than the decision value $K_1=3$ and the value 2 for $K_2$ in the node $D_2$ is equal to the decision value (in the case of equivalence to the decision value, the process is continued on the left). At the end of the left branch of the node $D_2$, a new branch is formed. At this point, the range of values between 0 and 3 remains for the possible range of values of $K_1$ and the range of values between 0 and 3 also remains for the range of values of the key $K_2$.

For both ranges of values, the mean value is thus 1.5, in which the value $3=K_2$ of the domain block 4 deviates from this mean value to a larger extent than the value 1 of the key $K_1$. The mean value 1.5 of the remaining range of values between 0 and 3 of the key $K_2$ is thereby selected as the new decision value for this node.

FIG. 3e) shows the introduction of a node for the last domain block $D_5$. Its value for $K_1=5$ is above the decision threshold $K_1=3$ of the node $D_1$, so that the branch to the right is selected first. However, at the branch $D_3$, the path to the left is selected, because the value $K_2=2$ of $D_5$ is smaller than the decision threshold 3 for $K_2$ at the node $D_3$. For the range of values of $K_1$, the range between 3 and 6 having a mean value of 4.5 remains at the new branch to be introduced. For the range of values of $K_2$, the range of values between 0 and 3 having a mean value of 1.5 remains. In these cases, the values 5 for $K_1$ and 2 for $K_2$ of the domain block 5 deviate in the same way from the mean values of 4.5 and 1.5, so that here (as a possible alternative) the mean value 4.5 for the key $K_1$ is introduced in the branch.

In principle, this structure of the search tree shown diagrammatically in FIG. 3 may be used in the manner described above for an arbitrary number of domain blocks of an image.

If, for a range block of an image, that domain block of the image is searched which can be imaged on this range block with minimal deviations while using a transformation function and possibly under rotation at different planes, the same keys $K_1$ and $K_2$ as for the domain blocks are formed for this range block. In conformity with the values of these keys $K_1$ and $K_2$, the search tree shown in, for example, FIG. 3e) is run through. After the search tree has been run through, an end point is finally reached. This end point is preceded by a branch which thus represents the last branch which was passed before reaching the end point. This branch shows that domain block whose keys $K_1$ and $K_2$ best approximate the keys of the range blocks for which a domain block is searched. The domain block searched for the fractal image coding is then found, which domain block can be imaged on the range block with minimal deviations.

Because of the simplification by virtue of the search tree strategy, particularly by the selection of a one-dimensional search tree, there may be constellations in special cases in which this domain block, on the basis of which the last branch was formed before reaching the end of the search tree, is not the next block, i.e. it is not that domain block whose keys best approximate the keys of the range block for which the domain block is searched.

By way of example, such a case is shown diagrammatically in FIG. 4. In conformity with FIG. 2, this Figure shows several points of a range block R and domain blocks B1 to B4 in accordance with the values of their keys $K_1$ and $K_2$.

Based on the structure of a search tree, the domain block B1 would be determined as being the most favourable for the range block R, because it is found in the same quadrant in conformity with the finest division allowed by the search tree. However, FIG. 4 shows that the data of the keys $K_1$ and $K_2$ of the range block B2 are actually nearer to the keys of the range block R. In this case, the domain block B1 found would not be the optimum block. The search for the optimum range block, which was the domain block B2 in the example shown in FIG. 4, may be performed by comparing the data of the keys of all those domain blocks, based on which branches have been produced in this plane, with the data of the range block at the plane of the range block B1 established as being the optimum block. Thus, the last node plane on which the B1 block found is located is reverted to. All branches of this plane are examined and those domain blocks, on the basis of whose data a branch was introduced at this plane in the search tree during the process of creating the search tree, are compared with the range block.

FIG. 5 shows diagrammatically a block of 4×4 pixels. This block may be a range block or a domain block. With reference to FIG. 5, a possibility of gaining invariant keys for this block will be explained.

It is possible to gain the invariant keys by grouping the pixels of the block in various categories. Such pixels belong to the same category which, after one of the admissible rotations or mirrored positions of the block, again land at a position at which a pixel of the same category was previously present.

FIG. 5 shows that the pixels at each outer corner are grouped in a first category A. If the block is rotated 90°, 180° or 270°, or if it is mirrored at one of the longitudinal axes, the pixels of the category A are again imaged at a location within the block at which a pixel of the same category A was previously present.

The same applies to the pixel of category B arranged at the outer edges of the block between the pixels of category A. Similarly, the pixels of category C, which are arranged in the central four positions of the block, are imaged at locations of pixels of the same category.

Thus, three possible categories are obtained for the example of a block with 4×4 pixels shown in FIG. 5. The pixel values of the pixels of a category are cumulated. In this way, three sums result for three categories, each sum representing an invariant key. In the embodiment shown in FIG. 5, there is then one invariant key which results from the sum of the pixel values of the pixels of the category A, as well as two further invariant keys of the corresponding sums of the pixels of categories B and C.

Figure 6:
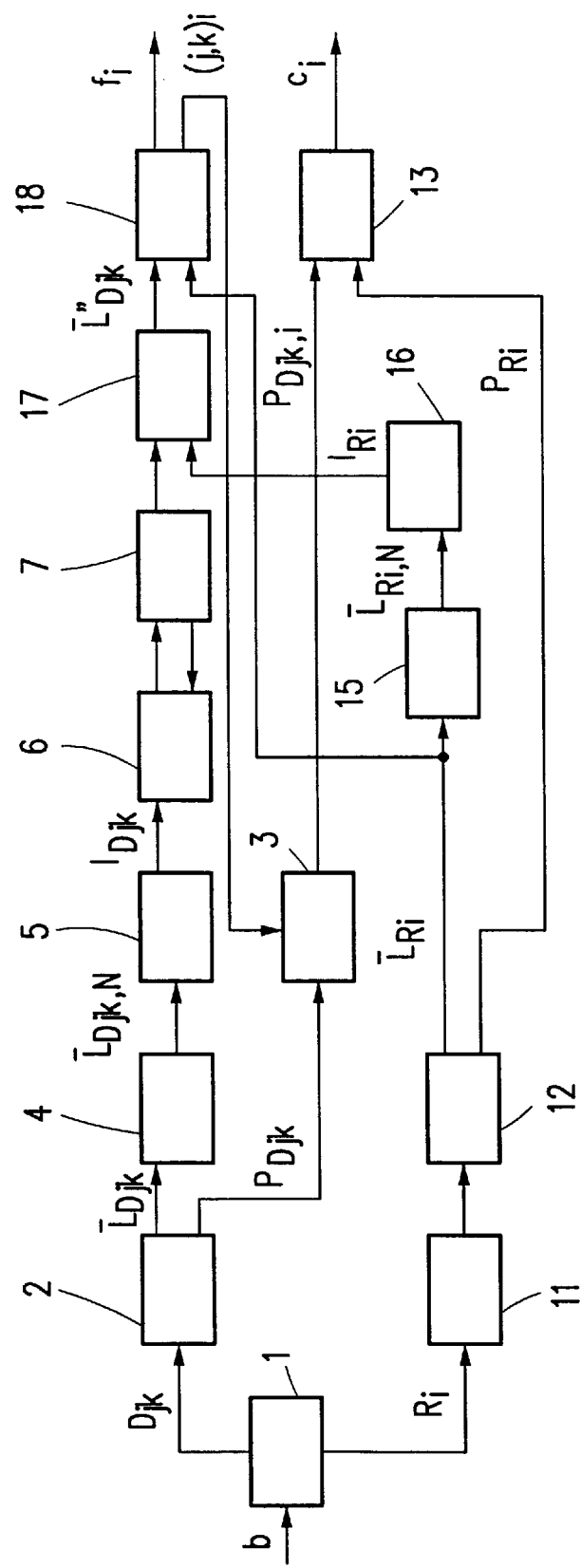
FIG. 6 shows an encoder which employs the residual roughness of the range blocks and domain blocks for their comparison, using the search tree strategy.

FIG. 6 shows an embodiment of an encoder in a block schematic diagram. This encoder operates with a search tree strategy in accordance with the invention.

Additionally, the search for appropriate domain blocks in this encoder is simplified in that geometrical basis functions are subtracted from the data of the pixels of both the range blocks and the domain blocks before comparison of the range blocks with the domain blocks. Only the remaining surface structures of the domain blocks and the range blocks are subsequently compared with each other.

The input of the encoder shown in FIG. 6 receives a digital picture signal b, which is a line-sequentially read image and is present in the form of digital data. The image data of the individual pixels are thus present in a time sequence in the picture signal.

This picture signal is applied in the encoder to a circuit block 1 in which a block is formed. Range blocks $R_i$ and domain blocks $D_{jk}$ are fixed in the data of all pixels of an image. Each range block comprises n×n pixels. All range blocks combined comprise the overall image contents of an image. The domain blocks have a size of 2n×2n. As a result, the encoder searches domain blocks which can be satisfactorily imaged on the range blocks, i.e. with a minimal number of errors. This process is performed for each individual range block.

In this process, not only the domain block is compared in its original form for each range block, but imaging functions are searched which, when used, image the domain block optimally on the respective range block. The encoder eventually supplies these functions as an output signal.

In the Figure, the domain blocks are denoted by $D_{jk}$ and the range blocks are denoted by $R_i$.

The data of the domain blocks $D_{jk}$ are serially arranged in the circuit element 2, i.e. the pixels of a block are sequentially arranged. An arrangement for splitting off the basis functions or polynomial terms is further provided in this block. This arrangement has for its object to find and split off those basis functions or, in spacial cases, polynomials which best approximate the actual image contents of the relevant block. These polynomial terms are denoted by $P_{Djk}$ in FIG. 6.

The remaining part of the image, i.e. the difference between the actual image contents and the polynomial terms, which will hereinafter be referred to as residual roughness, is denoted by $\overline{L}_{Djk}$ in the Figure.

The polynomial terms $P_{Djk}$ are stored in a buffer memory 3. The residual roughnesses $\overline{L}''_{Djk}$ are applied for normalization in a block 4. In this block, the residual roughness is normalized at the value of 1.

The normalized residual roughnesses $\overline{L}_{Djk,N}$ are applied to a further circuit block 5 in which the above-described invariants are computed. This may be carried out, for example, in the manner described above by evaluating, for each pixel of a block, the pixel values of neighbouring pixels in dependence upon their distance from the pixel, by forming the power of these evaluated pixel values and by forming the mean value from the powers. The invariants $I_{Djk}$ thus computed are used in a further circuit block for the structure of a search tree. This search tree may be structured, for example, in the way as shown diagrammatically in FIGS. 2 and 3.

This search tree thus formed is stored in a memory 7.

Due to the split-off of polynomial terms $P_{Djk}$, only the residual roughness is essential for the structure of this search tree. Based on the residual roughness, the invariant keys $I_{Djk}$ are formed, with reference to which keys the search tree is built up.

The range blocks $R_i$ split off in the circuit block 1 are buffered in a circuit block 11 which precedes a circuit block 12 for the purpose of split-up. In this circuit block, the range blocks are split up in a corresponding manner into polynomial terms $P_{Ri}$ which are applied to a circuit block 13 for parameter computation and are split up into the residual roughnesses $\overline{L}_{Ri}$. These are applied to a circuit block 15 for normalization, in which a normalization at the value of 1 is performed.

The normalized residual roughnesses $\overline{L}_{Ri,N}$ are applied to a circuit block 16 in which the invariants are computed. The computation of the invariants for the residual roughnesses of the range blocks should be performed in the same manner as the computation of the invariants for the domain blocks in the circuit block 5.

The memory 7, in which the search tree formed on the basis of the data of the domain block invariants is stored, precedes a circuit block 17 for searching the tree.

The circuit block 17 uses the search tree stored in the tree memory 7 and introduces the invariants $I_{Ri}$ of the range blocks supplied by the circuit block 16 for searching the tree. In conformity with the values of the invariants of these range blocks, that domain block whose pixel values can be imaged on the range block with a minimal deviation while using a transformation function, is searched for each range block with the aid of the digital search tree. The search is effected, for example, in the way as described with reference to FIG. 4.

The encoder shown in FIG. 6 has a circuit block 18 whose output supplies a signal denoted by $f_1$ in the Figure, which signal indicates the optimum domain block, its local variation as well as the associated transformation function. Moreover, the block 7 supplies the address of the domain block which was found as an optimum block for a range block. This address is applied to the parameter memory 3 from which the parameters of the domain block found are read. These parameters are denoted by $P_{Djk,i}$ in FIG. 6. They are applied to the circuit element 13 in which these polynomial terms of the domain blocks are balanced with the polynomial terms $P_{Ri}$ of the range blocks. The balanced values of the polynomial terms are denoted by $C_i$ in the Figure. They are also transmitted to the receiver end.

In a decoder, not shown in FIG. 6, these balanced polynominal terms $C_i$ as well as the data $f_i$ of the domain blocks found can be found by way of imaging for the purpose of restoring the range blocks. This imaging process should be iterated until the range block has been restored in its original form.

The encoder shown in FIG. 6 has the advantage that the search for an appropriate domain block, whose data can be imaged on a range block with a minimal deviation while using a transformation function, is simplified in two ways. On the one hand, the unchanged supply of values of each block no longer needs to be used for the search process, because geometrical basis functions, for example, polynomials are subtracted from the values. Only the remaining residual roughnesses should be taken into account in the search process. In the comparison of these residual roughnesses, a further essential simplification is achieved by using the digital search tree strategy.

We claim:

1. A method of data reduction of a luminance and/or chrominance signal of a digital picture signal by means of fractal image coding, in which method each image of the luminance/chrominance signal is divided into range blocks of n×n pixels each, in which a domain block is searched for each range block, which domain block is imageable on the range block with a minimal deviation while using a transformation function, which domain blocks have a larger size than the range blocks, and in which information on the transformation functions is transmitted, from which information the image data are regained at the receiver end in an iterative process, characterized in that a digital search tree strategy is employed in the search for that domain block which is imageable on a range block with a minimal deviation while using a transformation function and wherein domain block keys are used as criteria for the search tree structure, which keys are invariant with respect to a local rotation of the domain blocks and in that the same keys are employed for the range blocks.

2. A method as claimed in claim 1, characterized in that the invariant keys are generated in such a way that the pixels of a block are grouped in categories, the pixels of a category within the block being arranged in such a way that the pixels of this category are again present at a location of a pixel of the same category after one of the admissible rotations or mirrored positions of the block, and in that the sum of the values of the pixels of a category each time constitutes an invariant key.

3. A method as claimed in claim 1, characterized in that, in accordance with the invariant keys of all domain blocks, a search tree is constructed which is subsequently run through in accordance with the similar invariant keys of each range block for which a domain block is searched, until an end point (leaf) of the search tree is reached, and in that the domain block, on the basis of whose keys the branch last run through in the search tree was inserted in the tree, represents the searched domain block.

4. A method as claimed in claim 2, characterized in that the difference between the range block and the most favourable domain block is determined, in that the search tree is run through as far as a node whose associated domain block reaches or exceeds this difference after all deviating directions, in that all domain blocks of the subtree up to this node are examined on whether they deviate to an even smaller extent from the range block than the domain block originally determined as the most favourable block, and in that, if necessary, the most favourable domain block of the subtree is selected.

5. A method as claimed in claim 1, characterized in that the search tree is constructed as a one-dimensional search tree whose nodes are each time given a value of that key whose value deviates most from the mean value of the range of values of the key still remaining in the relevant branch of the tree.

6. A method as claimed in claim 1, characterized in that the data of each range block are examined on geometrical basis functions which are possibly satisfactory approximations of the data structure of the range block, in that a difference value is computed from the basis function found for the best approximation of the data structure of the range block and from the data of the range block, which difference value represents a residual roughness, in that the data of the domain blocks are examined on geometrical basis functions which are possibly satisfactory approximations of the data structure of the domain block, in that a difference value is computed from the basis function found for the best approximation of the data structure of the domain block and from the data of the domain block, which difference value represents a residual roughness, in that the search tree strategy is employed for the search for the domain block which is imageable on a range block with a minimal deviation, in that the associated transformation function is computed with reference to the computed difference values of the range block and the computed difference values of the domain blocks, and in that information on the mutually balanced basis functions of this block and of the most favourable domain block, as well as the transformation function, by means of which the most favourable domain block is imageable on the range block, is transmitted for each range block as a data-reduced data current instead of the luminance/chrominance signal.

7. An encoder comprising:

a device which performs data reduction of a luminance and/or chrominance signal of a digital picture signal by means of fractal image coding wherein each image of the luminance/chrominance signal is divided into range blocks of n×n pixels each, in which a domain block is searched for each range block, which domain block is imageable on the range block with a minimal deviation while using a transformation function, which domain blocks have a larger size than the range blocks, and in which information on the transformation functions is transmitted, from which information the image data are regained at the receiver end in an iterative process, and wherein in that a digital search tree strategy is employed in the search for that domain block which is imageable on a range block with a minimal deviation while using a transformation function and wherein domain block keys are used as criteria for the search tree structure, which keys are invariant with respect to a local rotation of the domain blocks and in that the same keys are employed for the range blocks, characterized in that, after formation of the range blocks and the domain blocks, the encoder splits off the most favourable basis function for each block, subsequently determines for each range block, with reference to its difference value and by means of the digital search tree strategy, that domain block whose difference value is imageable on the range block with a minimal deviation while using a transformation function, in that the encoder balances the difference value of the range block and that of the most favourable domain block, and in that the encoder supplies this balanced difference value as well as the transformation function, by means of which the most favourable domain block is imageable on the range block, as an output signal.

* * * * *